Patented Apr. 6, 1943

2,315,817

UNITED STATES PATENT OFFICE 2,315,817

ENOLESTERS OF THE SATURATED AND UNSATURATED PREGNANE-20-ONES AND PROCESS FOR THE CONVERSION OF ACETYLENE DERIVATIVES

Leopold Ruzicka, Zurich, Switzerland, assignor, by mesne assignments, to Ciba Pharmaceutical Products, Incorporated, Summit, N. J., a corporation of New Jersey No Drawing. Application February 8, 1940, Serial No. 317,986. In Switzerland February 10, 1939

11 Claims. (Cl. 260—397.4)

The addition of water at the triple bond of acetylene derivatives takes place in the presence of salts of heavy metals which act as catalysts and, preferably, in the presence of strong acids, whereby the corresponding ketones are obtained. (Compare, for example, Houben, "Methoden der organischen Chemie," 2nd edition, vol. 2, pp. 815 ff: J. Am. Chem. Soc., vol 61 [1939], p. 79). Other processes also are known, according to which it is possible to obtain the same reaction products by way of isolatable intermediate products, such as enol derivatives or acetals; for this purpose organic acids or alcohols were added to the triple bond. (Compare, for example, Nieuwland and co-workers, J. Am. Chem. Soc., vol. 55 [1937], p. 2858, and vol. 56 [1934] p.1130). The addition takes place in these cases also by the action of acid-reacting substances, such as, for example, boro-fluoride complexes with glacial acetic acid or alcohols, and with addition of mercury salts. It has been shown by Myddleton and co-workers (J. Am. Chem. Soc., vol. 52, [1930], p. 4405) that the organo-mercury compounds resulting from the addition of mercury acetate in glacial acetic acid to the acetylene bond yield ketones by cleavage. The constitution of these organo-mercury compounds was therefore formulated in the following manner:

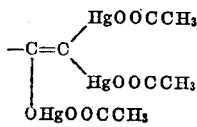

(From compounds with a terminal acetylene group)

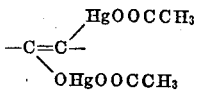

(From acetylene derivatives substituted in both carbon atoms of the acetylene group)

It is evident that by cleavage of such enol-mercury salts the corresponding ketones must be formed directly.

The surprising observation has now been made that the addition of mercury salts to acetylene derivatives proceeds differently in neutral, non-aqueous solutions from the way in which it proceeds in glacial acetic acid. The resulting reaction products are enolesters which contain mercury, and which, by suitable cleavage, may be converted into the mercury-free enolesters of the corresponding ketones. The same reaction products are unexpectedly obtained both in alcoholic solutions and in solvents containing no hydroxyl groups, and thus the alcohol which serves as solvent takes no part in the reaction. Contrary to this, it is known that, when the addition of mercury salts to double bonds proceeds in alcoholic solution, the solvent also takes part in the reaction, and ethers containing mercury in their molecules are formed:

—CH=CH— + HgX$_2$ + HOR ⟶ —CH—CH— + HX
$\quad\quad\quad\quad\quad\quad\quad\quad\quad\quad\quad\quad\quad\quad\quad$ |     |
$\quad\quad\quad\quad\quad\quad\quad\quad\quad\quad\quad\quad\quad\quad\quad$ OR   HgX X=monovalent anion; R=alkyl radical.

The course of the reaction according to the present process, in which the addition of mercury salts to mono- or disubstituted actylene derivatives takes place in neutral solvents, is illustrated by the following equations:

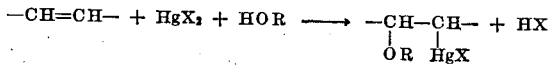

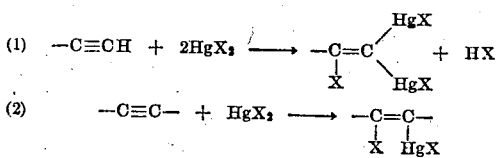

X=monovalent inorganic or organic acid radical.

By careful cleavage, the corresponding mercury-free compounds are obtained from the enolesters which contain mercury:

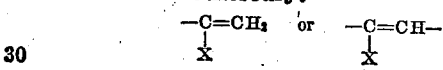

X=monovalent inorganic or organic acid radical.

The mercurial compounds occurring as intermediate products or the corresponding mercury-free enolesters normally are stable and capable of being isolated. However, should the carbon atoms on either side of the double bond show, as substituent, a free or substituted hydroxyl group or a halogen atom, rearrangement may take place in the molecule, as compounds of this type (i. e., of the allyl system) are known to be labile. Rearrangement is also possible in the case a second double bond stands in conjugation with the newly formed double linkage.

Thus, for example, starting with the 17-ethinyl derivatives of the androstane or androstene series, which have a hydrogen atom as second substituent at the 17-carbon atom, the corresponding 20-enol esters are obtained as products of a normal reaction. On the other hand, if the corresponding 17-hydroxy-17-ethinyl derivatives or their esters are used as parent substances, rearrangement takes place, and esters of α-hydroxyketones are obtained, which belong to another series. For the present process naturally not only compounds containing the cyclopentano polyhydro phenanthrene-nucleus may be used as starting materials but quite generally compounds of the aliphatic, aromatic, alicyclic and heterocyclic series.

The addition of the mercury salts takes place easily at room temperature. Suitable solvents for use in carrying out the reaction are, for example, alcohols, in particular methyl and ethyl alcohol, as they dissolve the acetylene derivatives as well as the mercury salts. However, use may also be made of other neutral solvents, such as, for example, ether, dioxane or ethyl acetate. Very convenient is the use of mercuric acetate whereby the corresponding enol acetates or their rearrangement products are formed. By use of mercuric salts of other organic acids, other enol esters or their rearrangement products may naturally be obtained in an analogous manner. Mercuric halides add to form the corresponding halogen derivatives.

If the decomposition of the stable mercurial enol esters takes place in a cautious manner, so that the saponification or acid interchange reaction of the enol ester group is avoided, the corresponding mercury-free enol esters may be obtained in very good yield. If the decomposition be carried out under less careful conditions, the corresponding ketones are obtained directly, which may also be formed by subsequent saponification of the enol esters.

For the cautious decomposition of the mercurial enol esters, or of the corresponding rearrangement products, with the object of preparing the mercury-free enol esters or the mercury-free rearrangement products, the use of hydrogen sulphide has proved particularly well suited. If use is made of salts of hydrogen sulphide, or if strong acids be utilized, which are also capable of cleaving the organo-mercury compounds, saponification of the enol ester groups, or of other ester groups resulting from the rearrangement of the molecule, may take place, and the corresponding ketones are obtained.

The new process for the conversion of acetylene derivatives into enol esters and ketones possesses great advantages over the processes already known. Since work is carried out in neutral solution, it is possible by means of this process to convert even sensitive derivatives of the acetylene series into enol esters, their corresponding ketones or compounds which are formed by rearrangement. If the parent material contains, in addition to the acetylene group, a double bond which is readily capable of being hydrated, the reaction may be limited to the acetylene group by careful regulation of the quantity of mercury salt applied. Thus there is no limitation to the choice of parent substances, and therefore any desired substituted acetylene derivative may be converted into the enol esters or ketones by means of the new process. The enol esters which are not capable of rearrangement may be readily isolated and are of great interest as parent substances for further conversions. The same may be said of the ketones obtained therefrom by saponification and of the compounds formed by rearrangement from corresponding acetylene derivatives.

*Example 1*

2.98 gms. $\Delta^5$-17-ethinyl - androstene - 3 - ole (which may be prepared, for example, from $\Delta^5$-17-ethinyl-androstene-3:17-diole by replacement of the 17-hydroxyl group by hydrogen in a known manner) and 6.4 gms. mercuric acetate are shaken in 500 ccm. of ethyl acetate for 24 hours at room temperature. Dry hydrogen sulphide is then led in, and the mixture is allowed to stand for 2 hours at room temperature. The precipitated mercury sulphide is very finely divided, and is filtered only with difficulty. For this reason, the solvent is evaporated in vacuo without previous removal of the mercury sulphide formed, and the residue is boiled out with ether to exhaustion. The ethereal solution in order to remove traces of mercury sulphide, is treated with charcoal and is then filtered and greatly concentrated. On being allowed to stand at $-10°$ C., the $\Delta^{5:20}$-20-acetoxy-pregnadiene-3 - ole formed crystallizes out. To purify, it is recrystallized from a mixture of ethyl acetate and hexane. When using mercury salts of other organic or even inorganic acids the corresponding enol esters of $\Delta^5$-pregnene-3-ole-20-one are obtained, for example the propionate, benzoate, bromide, chloride etc.

The enol acetate group in the 20-position may be readily saponified by means of a 0.1-N solution of caustic potash in methanol, when the $\Delta^5$-pregnene-3-ole-20-one, melting at 195° C., in addition to the 17-iso compound, melting at 173° C., is obtained.

By the new process there may be obtained not only the enol esters of $\Delta^5$-pregnene-3-ole-20-one but e. g. quite generally enol esters of the saturated and unsaturated pregnane-20-ones, like the 20-mono-enol esters of $\Delta^4$-pregnene-3.20-dione (for example the acetate, propionate, butyrates, benzoate, bromide or chloride), the enol esters of pregnane- and allo-pregnane-3-ole-20-one, the 20-mono-enol esters of pregnane- and allo-pregnane-3.20-dione.

*Example 2*

3.14 gms. of $\Delta^5$-17-ethinyl-androstene-3:17-diole and 6.4 gms. of mercuric acetate are shaken for 24 hours at room temperature in 400 ccm. of absolute ethyl alcohol. Dry hydrogen sulphide is then led in, and the mixture is allowed to stand for 2 hours at room temperature. The alcoholic solution is evaporated in vacuo without removal of the mercury sulphide, and the residue is boiled out several times with ether. The united ether extracts are treated with charcoal to remove the mercury sulphide residues, and are then filtered and greatly concentrated. On being allowed to stand at $-10°$ C., a product ($C_{23}H_{34}O_4$) crystallizes, being the mono-acetate of a dihydroxy-ketone formed by rearrangement. To obtain it in a pure state, it is several times recrystallized from ether and acetone and then melts at 221–222° C. $[\alpha]_D = -53°$ in dioxane.

By acetylation in pyridine and acetic anhydride, the mono-acetate yields the diacetate of the dihydroxyketone, melting at 190–192° C. $[\alpha]_D = -53°$ in dioxane.

By saponification with 0.1-N methyl alcoholic potash, the mono-acetate or diacetate yields the dihydroxyketone, $C_{21}H_{32}O_3$, melting at 275–277° C. $[\alpha]_D = -113°$ in dioxane.

*Example 3*

10 gms. of $\Delta^5$-17-ethinyl-androstene-3:17-diole and 20 gms. of mercuric acetate are shaken in 1500 ccm. of ethyl acetate for 24 hours at room temperature. The mercurial reaction product separates out. To attain cleavage, it is saturated with hydrogen sulphide and shaken for a further 3 hours. A portion of the ethyl acetate is then removed by evaporation in vacuo, the remaining mixture is separated from the mercury sulphide formed by adding charcoal and filtering and the ethyl acetate solution is then concentrated. The reaction product crystallizes on standing at $-10°$ C., and may be purified by recrystallizing from acetone, when the mono-acetate described in Example 2, with the melting point of 221-222° C., is obtained.

*Example 4*

100 mgms. of 17-ethinyl-androstane-3:17-diole and 210 mgms. of mercuric acetate are shaken in 25 ccm. ethyl acetate for 24 hours at room temperature. Hydrogen sulphide is then led in and, after addition of charcoal, the mixture is filtered. The solution is evaporated in vacuo, and the residue is recrystallized several times from ether-hexane. The mono-acetate of a dihydroxy-ketone ($C_{23}H_{36}O_4$) resulting from rearrangement of the molecule and melting at 202-204° C., is obtained. $[\alpha]_D = 0°$ in dioxane.

*Example 5*

980 mgms. of 17-ethinyl-androstane-3:17-diole diacetate and 1470 mgms. of mercuric acetate are shaken in 120 ccm. of ethyl acetate. In this case, the mercurial reaction product is soluble in ethyl acetate. After 24 hours, hydrogen sulphide is led in, and the product is worked up in the manner already described. The reaction product is recrystallized several times from ether. A diacetoxyketone ($C_{25}H_{38}O_5$) formed by rearrangement of the molecule and melting at 227-229° C., is obtained. $[\alpha]_D = -1.5°$ in dioxane.

By saponification with a 10 per cent solution of potassium carbonate in methyl alcohol of 70 per cent strength, the corresponding dihydroxyketone ($C_{21}H_{34}O_3$) is obtained from the diacetoxyketone. On heating quickly, it melts at 274-275° C. A transformation of the crystals occurs on heating slowly, yielding a modification which melts at 305° C.

The oxime, prepared in the usual manner from the dihydroxyketone, melts at 248-249° C. By acetylation in pyridine with acetic anhydride at room temperature, the dihydroxyketone yields a mono-acetate which melts at 244-245° C. $[\alpha]_D = -31°$ in dioxane.

*Example 6*

312 mgms. of 17-ethinyl-testosterone and 636 mgms. of mercuric acetate are shaken with 40 ccm. of absolute ethyl alcohol for 24 hours at room temperature, whereupon the mercurial compound partly separates. Cleavage of the molecule is obtained by leading in hydrogen sulphide and shaking for a further 2 hours. The mixture is evaporated in vacuo and the reaction product is extracted with ethyl acetate. The mono-acetate of a dihydroxyketone ($C_{23}H_{32}O_4$), melting at 198-200° C., is obtained by rearrangement of the molecule.

By saponification with a 10 per cent solution of potassium carbonate in methyl alcohol of 75 per cent strength, the acetate is converted into the corresponding hydroxydiketone ($C_{21}H_{30}O_3$), which melts at about 280° C. $[\alpha]_D = +47°$ in dioxane.

*Example 7*

5 gms. of 17-ethinyl-testosterone and 10 gms. of mercuric acetate are shaken in 1000 ccm. of ethyl acetate for 24 hours at room temperature, when a clear solution is obtained. This is worked up in the manner described above, by decomposition with hydrogen sulphide, filtration and evaporation. The crude product is recrystallized from methanol. The monoacetate described in Example 6, melting at 198-200° C., is obtained. $[\alpha]_D = +66°$ in dioxane.

*Example 8*

260 mgms. of 17-ethinyl-testosterone acetate and 470 mgms. of mercuric acetate are shaken in 50 ccm. of ethyl acetate for 24 hours. The mixture is worked up in the manner described in the previous examples. The reaction product, recrystallized from methanol, melts at 198-200° C., and is identical with the monoacetate described in Examples 6 and 7 ($C_{23}H_{32}O_4$).

*Example 9*

314 mgms. of $\Delta^5$-17-ethinyl-androstene-3:17-diole and 693 mgms. mercuric propionate are allowed to stand in 50 ccm. of propionic acid ethyl ester for 100 hours at room temperature. The mixture is then decomposed by hydrogen sulphide, warmed for a short time and, after addition of a little animal charcoal, the liquid is filtered from the precipitated mercury sulphide. The reaction product, obtained by evaporation of the solution, still contains some of the parent material, and in order to remove this, the product is dissolved in methanol, cooled to 0° C., and silver diamine solution is added. The precipitated silver salt is removed by filtration, the filtrate is diluted with water and extracted with ether, and the ether solution is washed, dried and evaporated. The residue is recrystallized from a mixture of ether and hexane, yielding the dihydroxyketone mono-propionate ($C_{24}H_{36}O_4$), which melts at 147° C., and which has been formed by rearrangement of the molecule. $[\alpha]_D = -50°$ in dioxane.

*Example 10*

200 mgms. of 17-ethinyl-androstane-3:17-diole diacetate and 442 mgms. of mercuric benzoate are shaken in 30 ccm. of ethyl acetate for 24 hours at room temperature. The mixture is saturated with hydrogen sulphide, warmed for a short time and filtered. The filtrate is diluted with ether, washed with soda solution and water, dried and evaporated. The residue is recrystallized several times from a mixture of ether and pentane, when the diacetoxyketone ($C_{25}H_{38}O_5$) described in Example 5, which has been formed by rearrangement of the molecule and which melts at 227-229° C., is obtained. $[\alpha]_D = -1.5°$ in dioxane.

*Example 11*

400 mgms. of 17-ethinyl-androstane-3.17-diole diacetate and 900 mgms. of mercuric benzoate are shaken in 100 ccm. of methanol for 65 hours at room temperature. The mixture is then saturated with hydrogen sulphide, filtered and evaporated. On recrystallization of the residue, using a mixture of ether and pentane as solvent, the diacetoxyketone of melting point 227-229° C. described in Examples 5 and 10 is obtained.

*Example 12*

200 mgms. of 17-ethinyl-androstane-3:17-diole diacetate and 375 mgms. of mercuric iso-butyrate are allowed to stand in 50 ccm. of iso-butyric acid ethyl ester for 72 hours at room temperature. Hydrogen sulphide is led into the clear solution, and, after boiling up with a little animal charcoal, the precipitated mercury sulphide is filtered off. The solution is evaporated and the residue is recrystallized from ether. The diacetoxylketone of melting point 227-229° C. described in Examples 5, 10 and 11 is obtained.

The same diacetoxyketone is formed by reacting 17-ethinyl-androstane-3:17-diole diacetate with mercuric isobutyrate in ethyl acetate.

In place of mercuric iso-butyrate other mercury salts of organic—or even of inorganic—acids may be used.

What I claim is:

1. Process for the conversion of acetylene derivatives of the saturated and unsaturated cylopentanopolyhydrophenanthrene series, comprising causing to react acetylene derivatives of the said series with mercury salts of a member of the group consisting of organic and inorganic acids, in neutral, non-aqueous solvents and splitting the resulting organo-mercury derivatives.

2. Process for the conversion of acetylene derivatives of the saturated and unsaturated cyclopentanopolyhydrophenanthrene series, comprising causing to react acetylene derivatives of the said series, with mercury salts of a member of the group consitsing of organic and inorganic acids, in neutral, non-aqueous solvents, splitting the resulting organo-mercury derivatives and converting any enol esters formed into the corresponding ketones by means of hydrolyzing agents.

3. Process according to claim 2, comprising splitting the organo-mercury compounds by means of hydrogen sulphide.

4. Process for the conversion of acetylene derivatives of the saturated and unsaturated cyclopentanopolyhydrophenanthrene series, comprising causing to react acetylene derivatives of the said series with mercury salts of a member of the group consisting of organic and inorganic acids, in neutral, non-aqueous solvents, splitting the resulting organo-mercury derivatives and converting any esters of $\alpha$-hydroxyketones, formed by rearrangement of the molecule, into the corresponding $\alpha$-hydroxyketones by means of hydrolyzing agents.

5. Process according to claim 4, comprising splitting the organo-mercury compounds by means of hydrogen sulphide.

6. The esters of lower aliphatic carboxylic acids with the enolized saturated and unsaturated pregnane-20-ones.

7. The esters of lower aliphatic carboxylic acids with the enolized $\Delta^5$-pregnene-3-ole-20-one.

8. The enolacetate of $\Delta^5$-pregnene-3-ole-20-one.

9. The esters of lower aliphatic carboxylic acids with the $\Delta^4$-pregnene-3,20-dione monoenolized in 20-position.

10. The 20-mono-enolacetate of $\Delta^4$-pregnene-3.20-dione.

11. The 20-mono-enolpropionate of $\Delta^4$-pregnene-3.20-dione.

LEOPOLD RUZICKA.